April 19, 1932. J. L. DRAKE 1,854,505
GLASS MELTING FURNACE
Filed March 2, 1927 2 Sheets-Sheet 1
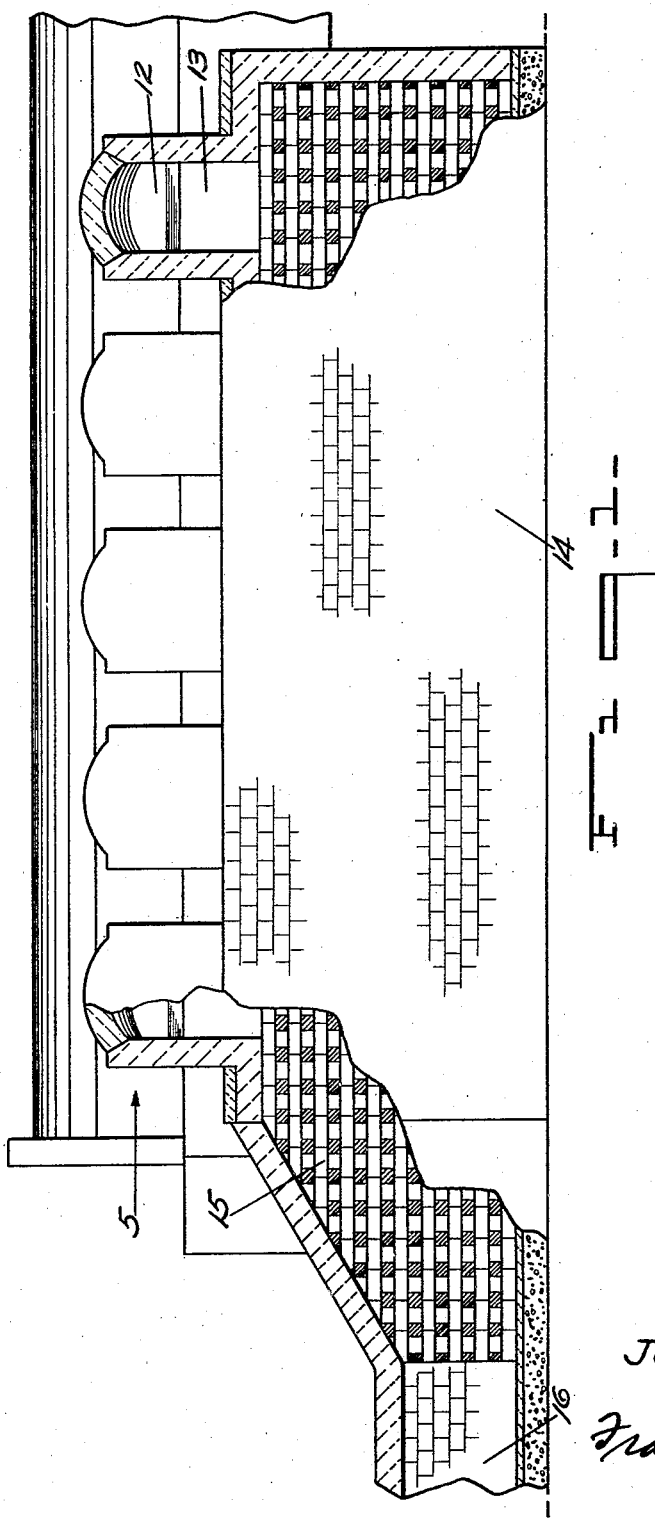
Inventor
John L. Drake
Frank Fraser
Attorney April 19, 1932. J. L. DRAKE 1,854,505
GLASS MELTING FURNACE
Filed March 2, 1927   2 Sheets-Sheet 2
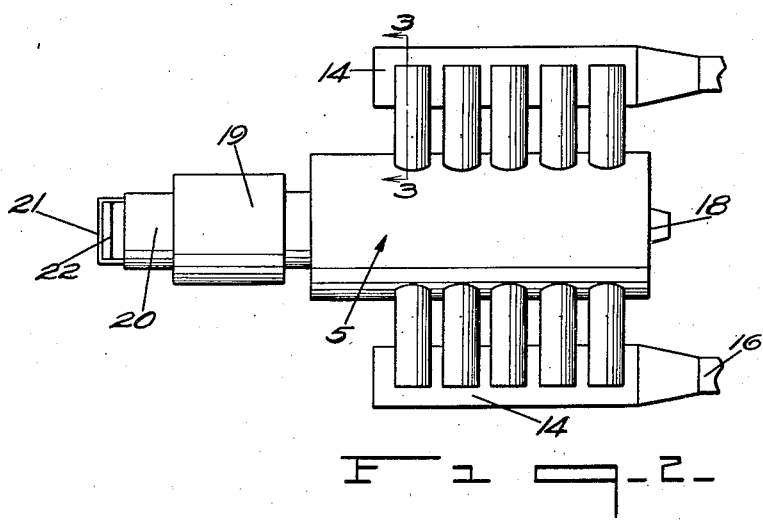
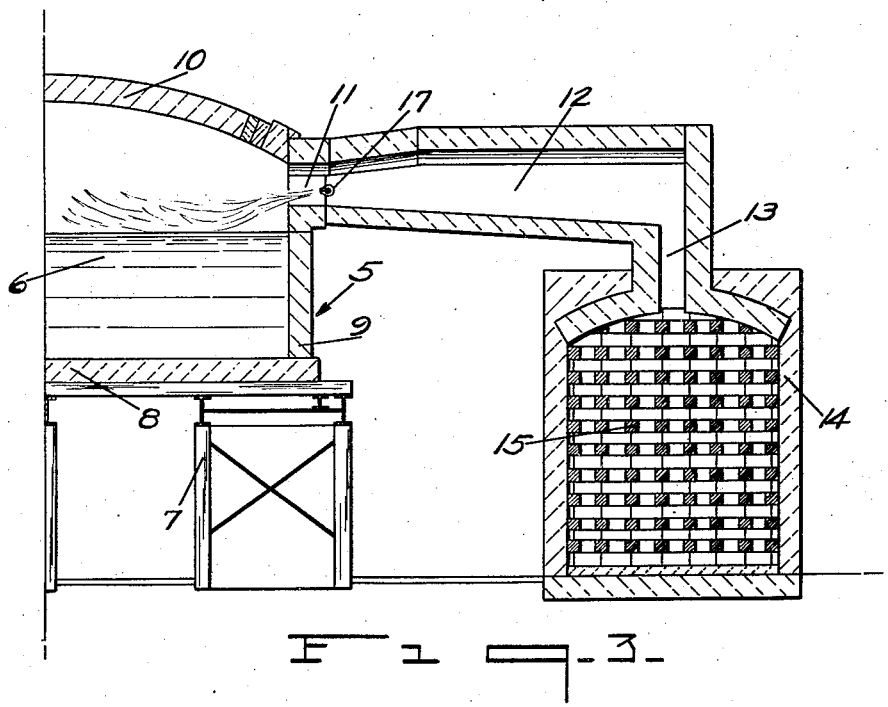
Inventor
John L. Drake
By Frank Fraser
Attorney Patented Apr. 19, 1932

1,854,505

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

GLASS MELTING FURNACE

Application filed March 2, 1927. Serial No. 171,957.

This invention relates to improvements in glass melting furnaces and more particularly to such a furnace of the regenerative type.

Heretofore, in certain types of regenerative glass melting furnaces, it has been customary to provide a single checker-chamber extending longitudinally at each side of the furnace and within which is arranged brick checker-work which functions to absorb heat from the burnt gases passing therethrough from the regenerative ports, to preheat the incoming air upon reversal of the furnace. Arranged beneath the checker-chamber is a longitudinally extending tunnel communicating therewith by means of a plurality of openings and through which tunnel the outgoing gases and incoming air are adapted to alternately pass. However, with this type of furnace installation, it has been found that only about two-thirds of the checker-work is actually utilized for heating the air because of the non-uniformity of flow of the air and gases through the checker-work. Also, the air and gases pass through the checker-work in such a manner that eddies and dead air spaces are formed therein.

It is the aim of the present invention to provide an improved furnace installation of this type wherein the flow of air and gases through the checker-work will be much more uniform to the end that the entire checker-work will be actually utilized for preheating the incoming air and the formation of eddies and dead air spaces in the checker-work will be reduced to a minimum. This utilization of the entire checker-work will cause a more efficient preheating of the air with the result that a considerable saving of the total fuel consumption will be effected.

Other objects and advantages of the invention will become more readily apparent from the following description when taken in connection with the accompanying drawings.

In the drawings forming a part of this application and wherein like numerals are employed to designate like parts throughout the same, Fig. 1 is a side elevation, partially in section of an improved glass melting furnace constructed in accordance with the present invention.

Fig. 2 is a diagrammatic top plan view thereof, and

Fig. 3 is a transverse section taken on line 3—3 of Fig. 2.

The furnace installation disclosed herein comprises a melting tank 5 containing a pool of molten glass 6 and being mounted on any suitable supporting structure such as indicated at 7. The tank 5 comprises a bottom 8, side walls 9 extending upwardly therefrom and a cover arch 10. Formed in the side walls 9 just above the level of the molten glass 6 are a plurality of pairs of oppositely disposed ports 11.

Communicating with the ports 11 at the same side of the furnace, by means of passages 12 and 13, is a longitudinally extending checker-chamber 14 within which is arranged the brick checker-work 15. Heretofore, it has been customary to provide beneath the checker-chamber a longitudinally extending tunnel which communicates with the checker-chamber through a plurality of openings positioned beneath the passages 13 and through which tunnel the outgoing gases and incoming air are adapted to alternately pass. However, the disadvantages of such a construction have been clearly brought out hereinabove.

In accordance with the present invention, this usual tunnel is eliminated and instead, the checker-chamber 14 is provided at one end and adjacent the bottom thereof with a reduced opening 16 which provides the outlet for the gases passing through the checker-work and the inlet for the incoming air passing to the ports. The gas is adapted to be fed into each passage 12 adjacent the port 11 from a burner 17 which projects through an opening in the side walls of said passage.

In the operation of this type of furnace, the flames shoot across the melting tank 5 from one side of the furnace and exit through the ports at the opposite side, the exhaust gases passing through the checker-work 15 and out through the opening 16 in the checker-chamber. This checker-work absorbs the heat from the exhaust gases passing therethrough to preheat the incoming air upon reversal of the furnace. When the operation of the furnace is reversed, the air used by the furnace is drawn in through the opening 16 and passes through the checker-work, passages 12 and 13 and is delivered through the ports 11 into the furnace above the molten glass 6 or glass producing materials therein. The gas issuing from the burners 17 unites with the heated air flowing in through passages 12 to form a flame which passes into the furnace and melts the glass producing materials therein. The exhaust gases then exit through the opposite ports heating the opposite checker-work as will be readily understood.

As will be seen, when the exhaust gases pass through the checker-work, the gases issuing from the different ports will follow different paths and flow longitudinally through the checker-work and out of the opening 16 with the result that there will be created uniformity of flow of the gases through said checker-work whereby the entire checker-work will be uniformly heated so as to uniformly heat the incoming air which passes therethrough to the ports upon reversal of the furnace. In this way, the entire checker-work will be utilized to its full capacity which will cause a more efficient preheating of the air resulting in a saving of the total fuel consumption. The forming of eddies and dead air spaces within the checker-work will also be materially reduced.

The glass batch is fed into a so-called doghouse 18 at one end of the furnace and gradually melts within the melting tank 5 due to the intense heat to which it is subjected to form the mass of molten glass 6. The molten glass is then adapted to continuously flow into the refining portion 19 of the furnace and then through a cooling chamber 20 into a receptacle or draw-pot 21 from which it may be drawn away in sheet form as indicated at 22 or formed into other glass articles as desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A glass melting furnace of the regenerative type, including a melting tank having a series of ports therein through which burnt gases are adapted to pass, a single checker-work for receiving the gases issuing from said ports, and means for causing said gases to pass longitudinally through said checker-work to heat the same.

2. A glass melting furnace of the regenerative type, including an elongated melting tank having a series of ports in one side wall thereof through which burnt gases are adapted to pass, a checker-work for receiving the gases issuing from said ports, and a checker-chamber housing said checker-work and provided with a single opening at one end thereof.

3. A glass melting furnace of the regenerative type, including an elongated melting tank having a series of ports in one side wall thereof, means communicating with said ports and provided with a single opening for feeding air thereto, and means for preheating the air as it passes through the first named means to the said ports.

4. A glass melting furnace of the regenerative type, including a melting tank having a series of ports therein, a single means extending longitudinally of the melting tank and communicating with said ports and provided with a single opening for feeding air thereto, and means arranged within the first named means for preheating the air as it passes therethrough to the said ports.

5. A glass melting furnace of the regenerative type, including a melting tank having a series of ports therein, and means for absorbing heat from the burnt gases exhausting through the ports to preheat the incoming air passing to said ports, said means being provided with a single opening through which both the air and gases must pass.

6. A glass melting furnace of the regenerative type, including a melting tank having a series of ports therein, and a single means extending longitudinally of the melting tank and communicating with said ports for absorbing heat from the burnt gases exhausting through the ports to preheat the incoming air passing to said ports, said means being provided with a single opening at one end thereof through which both the air and gases must pass.

7. A glass melting furnace of the regenerative type, including an elongated melting tank having a series of ports in one side wall thereof, a checker-chamber extending longitudinally of the furnace and having a plurality of passages communicating with said ports, said checker-chamber being provided with a reduced opening at one end adjacent the bottom thereof, and a checker-work arranged within said checker-chamber.

8. A glass melting furnace of the regenerative type, including a melting tank having a plurality of spaced ports therein arranged longitudinally thereof, a checker-chamber extending longitudinally of the melting tank and in communication with said ports by means of a plurality of passages, and a checker-work arranged within said checker-chamber and extending throughout the entire length thereof, the said checker chamber being provided with a single opening at one end thereof.

9. A glass melting furnace of the regenerative type, including a melting tank having a plurality of spaced ports therein arranged longitudinally thereof, a checker-chamber extending longitudinally of the melting tank and communicating with said ports by means of a plurality of passages, said passages entering the top of said checker-chamber at spaced points longitudinally thereof, and a checker-work arranged within said checker-chamber and extending throughout the entire length thereof, the said checker-chamber having imperforate side and bottom walls and being provided with a single reduced opening at one end adjacent the bottom thereof to cause the air and gases to pass longitudinally through the checker-work.

10. A glass melting furnace of the regenerative type including an elongated melting tank having a plurality of spaced ports arranged longitudinally in each side wall thereof, a checker chamber extending longitudinally at each side of the melting tank and communicating with the respective ports by means of a plurality of passages, said passages entering the top of the checker chamber at spaced points longitudinally thereof, and a checker work arranged within each checker chamber and extending substantially throughout the entire length thereof, each checker chamber having imperforate side and bottom walls and being provided with a single opening at one end adjacent the bottom thereof to cause the air and gases to pass longitudinally through the checker work.

Signed at Toledo, in the county of Lucas and State of Ohio, this 26th day of February, 1927.

JOHN L. DRAKE.